United States Patent [19]

Suzuki

[11] Patent Number: 5,288,155
[45] Date of Patent: Feb. 22, 1994

[54] PRINTER CAPABLE OF DISPLAYING SELECTED FONT

[75] Inventor: Makoto Suzuki, Kani, Japan

[73] Assignee: Brother Kogyo Kabushiki Kaisha, Nagoya, Japan

[21] Appl. No.: 855,488

[22] Filed: Mar. 23, 1992

Related U.S. Application Data

[63] Continuation of Ser. No. 524,011, May 16, 1990, abandoned.

[30] Foreign Application Priority Data

May 16, 1989 [JP] Japan ............................ 1-55924[U]
May 16, 1989 [JP] Japan ............................ 1-55925[U]

[51] Int. Cl.$^5$ ............................................. B41J 3/46
[52] U.S. Cl. .................................... 400/83; 400/692; 400/121
[58] Field of Search .................. 400/83, 121, 692

[56] References Cited

U.S. PATENT DOCUMENTS

| | | | |
|---|---|---|---|
| 4,051,488 | 9/1977 | Tidd | 354/13 |
| 4,121,228 | 10/1978 | Cowe et al. | 340/735 |
| 4,335,940 | 6/1982 | Morgan | 354/15 |
| 4,846,597 | 7/1989 | Bryant et al. | 400/61 |
| 4,883,376 | 11/1989 | Iwase et al. | 400/691 |
| 4,898,483 | 2/1990 | Iizuka | 400/83 |
| 4,955,735 | 9/1990 | Sakuragi | 400/83 |

FOREIGN PATENT DOCUMENTS

| | | | |
|---|---|---|---|
| 3504937 | 8/1985 | Fed. Rep. of Germany | 400/83 |
| 179755 | 8/1986 | Japan | 400/121 |
| 27164 | 2/1987 | Japan | 400/703 |
| 128770 | 6/1987 | Japan | 400/83 |
| 48802 | 2/1988 | Japan | 400/83 |
| 145047 | 6/1988 | Japan | 400/83 |
| 2044969 | 10/1980 | United Kingdom | 400/703 |

OTHER PUBLICATIONS

Print Master User's Guide, pp. 1-9, copyright 1985, Unison World Inc.

Primary Examiner—David A. Wiecking
Attorney, Agent, or Firm—Oliff & Berridge

[57] ABSTRACT

A printer of the type in which a plurality of fonts, each having its own name and its own configuration, are incorporated. A font selection key is provided in a panel display unit for selection of a desired font. In one aspect of the invention, when the key is depressed, the configuration and the name of a font are displayed in two separate displays. In another aspect of the invention, a printer mode such as the number of sheets to be printed is displayed with the font selected by the font selection key. Accordingly, the font to be selected is visually recognizable and hence the selection of a font can be easily achieved.

9 Claims, 1 Drawing Sheet

PRINTER CAPABLE OF DISPLAYING SELECTED FONT

This is a continuation of application Ser. No. 07/524,011 filed May 16, 1990, now abandoned.

BACKGROUND OF THE INVENTION

The present invention relates to a printer incorporating therein at least two kinds of fonts.

There have been known printers which incorporate a plurality of fonts. In such printers, the fonts incorporated therein have been indicated by identifying their names. However, the user may want to recognize the shape or configuration of the font before printing. To this end, it has been a general practice to refer to a font list or to perform test printing with respect to the font selected. However, such procedures are troublesome and time consuming. Besides, a sheet of paper is wasted for the test printing.

SUMMARY OF THE INVENTION

The present invention has been made in view of the aforementioned circumstances, and accordingly it is an object of the invention to provide a printer incorporating a plurality of fonts wherein selection of a font can be achieved easily.

Briefly and in accordance with the present invention, when a font is selected through a panel switch provided in the printer, the shape or configuration of the font is displayed on a display panel.

In order to achieve the above and other objects of the invention, there is provided in accordance with one aspect of the invention a printer incorporating a plurality of fonts, each having its own name and its own configuration, comprising font selection means for selecting a desired font out of the plurality of fonts, first display means for displaying the configuration of the font selected by the font selection means, and second display means for displaying the name of the font selected by the font selection means.

A font storage means is provided for storing font data regarding the plurality of fonts incorporated in the printer, and processing means for reading and processing the font data regarding the font selected by the font selection means. The processing means processes the font data to provide the name of the font and the configuration of the font. The font data regarding the plurality of fonts are successively read out in accordance with successive manipulations of the font selection means. The font selection means may comprise the equal plurality of selection switches, and the font data regarding the plurality of fonts are selectively read out in accordance with selective manipulations of the selection switches.

When the font selection means is manipulated to select the desired font, the font data stored in the font storage means is read out or the font data transmitted from an external host computer is read out. The configuration and the name of the font selected are displayed in the first and second display means, respectively.

In accordance with another aspect of the invention, there is provided a printer incorporating a plurality of fonts, each having its own name and its own configuration, comprising font selection means for selecting a desired font out of the plurality of fonts, printer mode selection means for selecting a printer mode, and display means for displaying the printer mode selected by the printer mode selection means wherein the printer mode is displayed with the font selected by the font selection means.

Font storage means is further provided for storing font data regarding the plurality of fonts incorporated in the printer, and processing means for reading and processing the font data regarding the font selected by the font selection means. The processing means processes the font data to provide the configuration of the font. The font data regarding the plurality of fonts are successively read out in accordance with successive manipulations of the font selection means. The font selection means may also comprise a plurality of selection switches equal to the number of fonts with the font data regarding the plurality of fonts being selectively read out in accordance with manipulations of the selection switches.

Further, when the printer data, such as the number of sheets to be printed, is indicated in the display means it may be so done with the font selected by the font selection means.

DESCRIPTION OF THE PREFERRED EMBODIMENTS

Figure 1:
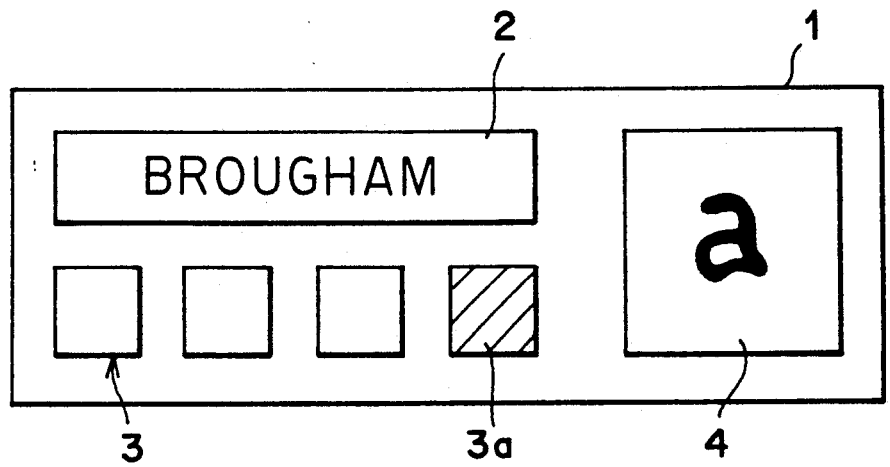
FIG. 1 is a plan view showing a panel display according to one embodiment of the present invention.

Referring to FIG. 1, one embodiment of the present invention will be described. In FIG. 1, there is shown a panel display unit 1 mounted on a printer. The display unit 1 includes a start key 3, various selection keys (unnumbered) for setting or selecting various kinds of printing modes, a font selection key 3a for selecting a desired font, a first display portion 2 for displaying a printing mode selected by one of the selection keys, and a second display portion 4 for displaying a font shape.

Figure 3:
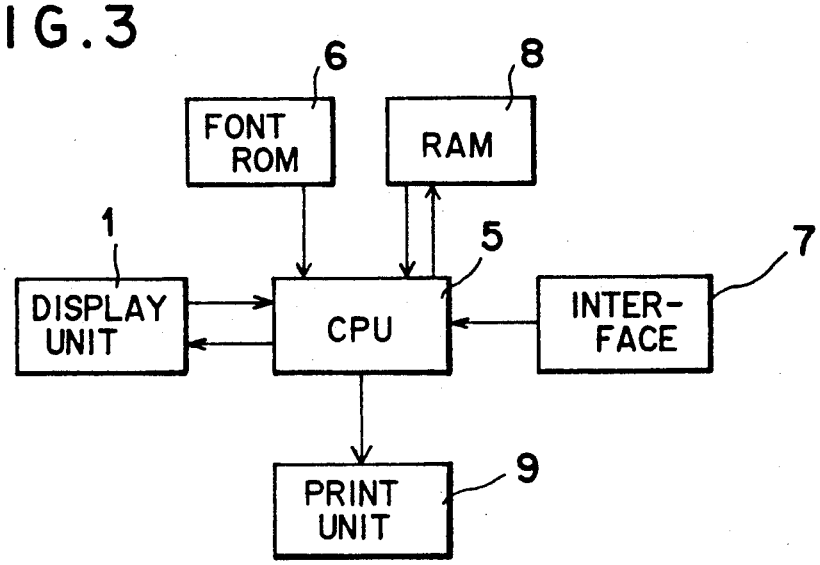
FIG. 3 is a block diagram showing an electrical arrangement of the printer according to the present invention.

An electrical arrangement of the printer is shown in block form in FIG. 3, which includes a central processing unit (CPU) 5. To the CPU 5, connected are a font read-only memory (ROM) 6, a random access memory (RAM) 8, an interface 7, the panel display 1, and a print unit 9. The font ROM 6 stores therein font data regarding a plurality of fonts which are available for the printer. The RAM 8 temporarily stores font data fed from an external host computer (not shown) connected through the interface 7. The print unit 9 carries out printing in accordance with print data fed from the host computer.

In operation, when the font selection key 3a is depressed one time, font data regarding a first font is read out of the font ROM 6 and the name of the font, e.g. BROUGHAM, is displayed in the first display portion 2 and the corresponding font shape is displayed in the second display portion 4 upon processing the font data in the CPU 5. When the font selection key 3a is depressed one more time, font data regarding a second font is read out of the font ROM 6. The CPU 5 processes the font data and displays the name of the second font in the first display portion 2 and the shape thereof in the second display portion 4. In this manner, when the font selection key 3a is successively depressed, each name and shape of the font are successively displayed or scrolled in the display portions 2 and 4.

When the start button 3 is depressed, the print data are transmitted to the print unit 9 together with the font data, so that the printing is carried out in accordance with the font selected and displayed.

Figure 2:
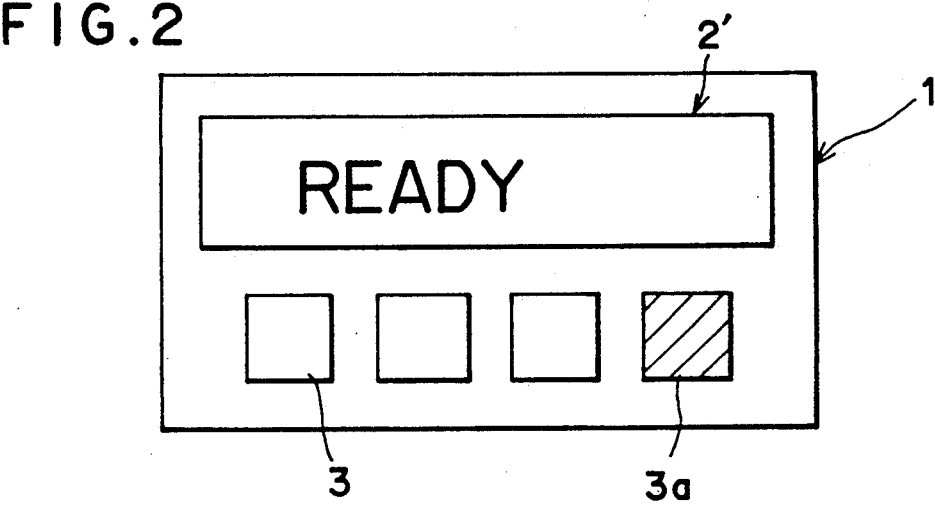
FIG. 2 is a plan view showing a panel display according to another embodiment of the present invention.

Referring to FIG. 2, another embodiment of the present invention will be described.

In this embodiment, a single display portion 2' is provided on the panel display unit 1, where a mode which is set by any one of the mode selection keys, is indicated with the font selected by the font selection key 3a or the font specified by a host computer connected through the interface 7.

In FIG. 3, when a mode selection key is depressed and the number of prints is, for example, set, the font which has been selected by the font selection key 3a is read out of the font ROM 6 or the font is read out of font data transmitted from the host computer through the interface 7. The number of prints is then indicated in the display portion 2' using the font selected or specified. If, with the depression of the font selection key 3a, another font is selected, data regarding the selected font is read out of the font ROM 6. The printing mode, i.e., the number of prints, is displayed with the selected font. Similar to the first embodiment, print data fed from the host computer is transmitted to the print unit 9 to thereby carry out printing with the font specified.

As described, according to the embodiments of the present invention, the font to be selected is visually recognizable, therefore, the selection of a font can be easily achieved. It is not necessary to print and confirm the font as is done conventionally.

While the present invention has been described with reference to specific embodiments, a variety of changes and modifications may be made without departing from the scope and spirit of the invention. For example, although the above-described embodiments employ a single font selection key with which a desired font is selected by repetitively depressing the key until the desired font is displayed, the same number of font selection keys as the number of the fonts incorporated in the printer may be separately provided to allow the operator to depress the relevant key corresponding to the font desired.

What is claimed is:

1. A printer physically separated from but electronically connected to an input device, comprising:
    font selection means for selecting a desired font out of a plurality of fonts incorporated in the printer;
    a first display, mounted on the printer, for displaying the configuration of the fonts selected by said selection means;
    a second display, mounted on the printer, for displaying the name of the font selected by said font selection means;
    font storage means storing font data regarding the plurality of fonts, each font having its own name and its own configuration of a group of dots representing each character and symbol of a print set, incorporating in the printer;
    processing means for reading and processing font data regarding the font selected by said font selection means, wherein said processing means processes the font data to provide the name of the font and the configuration of the font; and
    printer means for printing the print set in the desired font.

2. A printer according to claim 1, wherein the font data regarding the plurality of fonts are successively read out in accordance with successive manipulations of said font selection means.

3. A printer according to claim 1, wherein said font selection means comprises a number of selection switches equal to the plurality of fonts that are selectively read out in accordance with selective manipulations of the selection switches.

4. A printer physically separated from but electronically connected to an input device, comprising:
    font selection means for selecting a desired font out of a plurality of fonts incorporated in the printer;
    printer mode selection means for selecting a printer mode;
    a display, mounted on the printer, for displaying the printer mode selected by said printer mode selection means wherein the printer mode is displayed with a configuration of the font selected by said font selection means;
    font storage means storing font data regarding the plurality of fonts, each font having its own name and its own configuration of a group of dots representing each character and symbol of a print set, incorporated in the printer;
    processing means for reading and processing the font data regarding the font selected by said font selection means, wherein said processing means processes the font data to provide the configuration of the font; and
    printer means for printing the print set in the desired font.

5. A printer according to claim 4, wherein the font data regarding the plurality of fonts are successively read out in accordance with successive manipulations of said font selection means.

6. A printer according to claim 4, wherein said font selection means comprises a number of selection switches equal to the plurality of fonts that are selectively read out in accordance with selective manipulations of the selection switches.

7. A printer physically separated from but electronically connected to an input device comprising:
    font selection means for selecting a desired font out of a plurality of fonts incorporated in the printer;
    a display, mounted on the printer, for displaying a configuration of the font selected by said font selection means;
    font storage means showing font data regarding the plurality of fonts, each font having its own name and its own configuration of a group of dots representing each character and symbol of the print set, incorporated in the printer;
    processing means for reading and processing the font data regarding the font selected by said font selection means, wherein said processing means processes the font data to provide the name of the font and the configuration of the font; and
    printer means for printing the print set in the desired font.

8. A printer according to claim 7, wherein the font data regarding the plurality of fonts are successively read out in accordance with successive manipulations of said font selection means.

9. A printer according to claim 7, wherein said font selection means comprises a number of selection switches equal to the plurality of fonts that are selectively read out in accordance with selective manipulations of the selection switches.

* * * * *